UNITED STATES PATENT OFFICE.

E. E. MARCY, OF NEW YORK, N. Y.

IMPROVEMENT IN CURING AND TREATING CAOUTCHOUC.

Specification forming part of Letters Patent No. 25,272, dated August 30, 1859.

*To all whom it may concern:*

Be it known that I, E. E. MARCY, of the city of New York, in the State of New York, have invented a new and Improved Method of Preparing India-Rubber, which will cause it to retain permanent elasticity and withstand changes of temperature and emit no unpleasant odor; and I declare the following is a true description of the same.

The nature of my invention consists in the combination of hyposulphite of zinc and sulphuret of zinc with india-rubber or caoutchouc and submitting the compound thus formed to the action of heat. I combine these articles with india-rubber in the following proportions, which are the best known to me, although they may be varied with good results: To two parts of rubber I add one part of sulphuret of zinc and one part of hyposulphite of zinc, by weight, and mix or unite the compound by passing the same through the heated rollers or grinders now generally used in preparing and manufacturing india-rubber. After the mixture is thoroughly combined by grinding it may be spread upon cloth or rolled into sheets, or put into any other required form for use. It should then be subjected to the action of steam or water at a high temperature by being placed in a vessel containing steam at a heat from 248° to 350° Fahrenheit, or containing water or water and steam at the same high temperature. It may be necessary for the thorough curing of some articles to increase the temperature to 400° and upward; but the degree of temperature and the length of time that the compound must be submitted to the heat will depend, to a certain extent, upon the size and quality of the fabric; but the temperature will in no case be carried so high as to liberate sulphur from the compounds of zinc before described.

The application of heat by means of steam or hot water may be made by any of the well-known processes in the manufacture of india-rubber, and must be made by such means, as the compound will not cure satisfactorily in dry air at any temperature.

Other substances may be mixed and ground up with the compound for the purpose of increasing its bulk and hardening it, and for giving the fabrics other qualities well known to india-rubber manufacturers; but such articles have no effect in producing the result I have described. Such ingredients are well known to manufacturers of india-rubber, and may be used in connection with my discovery.

The sulphate or sulphite of zinc may be used with a good result, instead of the sulphuret, in combination with the hyposulphite, in the proportions hereinbefore indicated.

The goods manufactured by my process are of a white color, and possess many valuable properties which are not found in the goods cured by the processes of Goodyear and Hancock.

I do not claim the curing of india-rubber as specified in the patent of John Rider, dated June 1, 1852, for treating gutta-percha, nor as described in the patent of J. T. Trotter, December 3, 1850, or in the reissued patent of Tyer S. Helm, May, 1859; but What I do claim as my invention, and desire to secure by Letters Patent, is—

The improved process of curing india-rubber by combining it with the sulphuret of zinc and the hyposulphite of zinc in the manner hereinbefore described, and subjecting the compound to steam or water at the temperature stated, without the use of free sulphur in combination with the rubber or with said compound, substantially as described.

E. E. MARCY.

In presence of—
JAMES MARRINER,
FREDERICK C. WAGNER.